(12) United States Patent
Hypes et al.

(10) Patent No.: US 9,115,316 B2
(45) Date of Patent: Aug. 25, 2015

(54) INTERFACE AND MUD CONTROL SYSTEM AND METHOD FOR REFINERY DESALTERS

(75) Inventors: Ronald D. Hypes, Houston, TX (US); Jaime J. Castro, Cypress, TX (US); Francisco E. Vera, Cypress, TX (US); Marcus D. Sprenkel, Houston, TX (US); Rafiqul Khan, Cypress, TX (US)

(73) Assignee: Cameron International Corporation, Houston, TX (US)

(*) Notice: Subject to any disclaimer, the term of this patent is extended or adjusted under 35 U.S.C. 154(b) by 626 days.

(21) Appl. No.: 13/248,899

(22) Filed: Sep. 29, 2011

(65) Prior Publication Data

US 2013/0083620 A1    Apr. 4, 2013

(51) Int. Cl.
| | |
|---|---|
| B01F 15/00 | (2006.01) |
| B01F 13/00 | (2006.01) |
| C10G 31/08 | (2006.01) |
| B01D 21/00 | (2006.01) |
| B01J 4/00 | (2006.01) |
| C10G 33/06 | (2006.01) |
| B01D 17/02 | (2006.01) |
| B01D 17/12 | (2006.01) |
| B01D 19/00 | (2006.01) |

(Continued)

(52) U.S. Cl.
CPC ............ *C10G 31/08* (2013.01); *B01D 17/0214* (2013.01); *B01D 17/12* (2013.01); *B01D 19/0036* (2013.01); *B01D 21/0042* (2013.01); *B01D 21/0087* (2013.01); *B01D 21/10* (2013.01); *B01D 21/2416* (2013.01); *B01D 21/2472* (2013.01); *B01J 4/004* (2013.01); *C10G 33/06* (2013.01); *B01J 2204/002* (2013.01); *B01J 2204/005* (2013.01); *B01J 2219/182* (2013.01); *B01J 2219/1943* (2013.01); *C10G 2300/4081* (2013.01); *C10G 2300/805* (2013.01)

(58) Field of Classification Search
CPC ...... B01F 5/10; B01F 5/106; B01F 2003/125; B01J 2219/1943; B01J 4/004; B01J 2204/002; C10G 31/08; C10G 33/06; B01D 21/0087
USPC ......... 366/173.1, 173.2, 165.1; 210/520, 608; 62/68; 166/265; 196/46

See application file for complete search history.

(56) References Cited

U.S. PATENT DOCUMENTS

| | | |
|---|---|---|
| 2,765,917 A | 10/1956 | Francis, Jr. |
| 3,396,100 A | 8/1968 | Pettefer |
| 3,586,294 A | 6/1971 | Strong |

(Continued)

OTHER PUBLICATIONS

Definition of the word "Lance".*

*Primary Examiner* — Tony G Soohoo
*Assistant Examiner* — Anshu Bhatia
(74) *Attorney, Agent, or Firm* — Gable Gotwals

(57) ABSTRACT

A method and system for controlling an interface emulsion layer and mud layer within a desalter vessel includes injecting a water flow through a plurality of nozzles arranged about a piping circuit located in the brine water layer. Each nozzle is oriented toward an interior space of the desalter vessel and is arranged oblique to the piping circuit. The water flow through the plurality of nozzles causes a horizontal and vertical rotation of a volume of water that is effective for suspending solids in the water and promoting a collapse of the interface emulsion layer. The water velocity through each nozzle, which may be a recycled water flow, is preferably in a range of 1 to 3 fpm and each nozzle is preferably oriented at an angle of about 15° and 60° in a horizontal plane and a downward angle of about 15° and 60° in a vertical plane.

11 Claims, 7 Drawing Sheets

(51) Int. Cl.
  *B01D 21/24* (2006.01)
  *B01D 21/02* (2006.01)

(56) References Cited

U.S. PATENT DOCUMENTS

| | | | |
|---|---|---|---|
| 3,592,756 A | 7/1971 | Jarvis | |
| 4,291,549 A * | 9/1981 | Fujimura et al. | 366/170.3 |
| 4,554,074 A | 11/1985 | Broughton | |
| 5,132,025 A * | 7/1992 | Hays | 210/787 |
| 5,612,490 A * | 3/1997 | Carlson et al. | 210/610 |
| 6,010,634 A | 1/2000 | Sams et al. | |
| 6,033,901 A * | 3/2000 | Powell, Jr. | 435/281 |
| 6,416,675 B1 | 7/2002 | McCasland | |
| 2004/0035799 A1 | 2/2004 | Smith | |
| 2008/0000846 A1 | 1/2008 | Teichroeb et al. | |
| 2009/0294375 A1 | 12/2009 | Lange et al. | |
| 2010/0080077 A1 * | 4/2010 | Coy | 366/137 |
| 2010/0187186 A1 | 7/2010 | Howdeshell et al. | |

* cited by examiner

INTERFACE AND MUD CONTROL SYSTEM AND METHOD FOR REFINERY DESALTERS

BACKGROUND OF THE INVENTION

This invention relates to systems and methods used in crude oil production. More specifically, the invention relates to methods for treating and controlling a first solid-laden water layer or "rag" that accumulates at the oil/water interface within separation, dehydration or desalting equipment and a second solid-laden layer or "mud" that accumulates at the bottom of the separation, dehydration, or desalting equipment.

Once oil is produced it must be dehydrated and desalted to reduce the corrosion effect on production systems such as transportation carriers, pipelines, and refineries. The dehydration and desalting done at the oil producing facility is capable of removing the majority of the water and salts prior to delivery to a refinery. Once the oil is at the refining it is desalted again to reduce the salts to even lower and less corrosive levels. In addition to the water and dissolved salts carried by the oil, there may be a large quantity of solids ranging in size from very small sub-micron particles or fines to larger particles such as sands. The larger particles are readily removed by the oil production facility leaving the finer particles to be removed at the refinery.

In general, the smallest particles may contribute to the stability of an oil-water emulsion by forming a barrier around the water droplets thus preventing droplet coalescence and separation. Water droplets that are surrounded by these fines may be large enough to settle in the electrostatic desalter, but they are hindered from coalescing by the fines. The effect is for this solid-laden water layer to accumulate at the oil-water interface as a "rag." As this rag layer collapses the fines settle to the bottom of the vessel to form a "mud" layer where they must be removed periodically by a mud wash system.

This mud wash system consists of a set of spray nozzles that disperse a volume of fresh water into the desalter for the purpose of agitating the mud so it can be effectively removed from the desalter. Two primary methods for mud removal are practiced. One method is to do a timed mud wash where the vessel is washed only periodically as determined by the unit operator. The frequency depends on the solids (mud) loading and may be once per day or once per week, as examples. The disadvantage of periodic mud wash is that it sends high levels of oil wet solids to the water treatment facility where it must be handled for disposal. These periodic injections of oil wet solids can initiate an upset in the water quality.

The other method is a semi-continuous mud wash where sections of a vessel are washed sequentially. Upon the completion of all sections, the sequence is restarted. The advantage of a semi-continuous wash is to level the load of solids that are passed to the water treatment vessels. The disadvantage of both the semi-continuous and periodic methods is that solids are still allowed to settle in the bottom of the vessel where they can only be partially removed by each subsequent periodic washing.

While either method can handle the volume of fines in a refinery desalter, there remains a more significant problem that has not been properly dealt with before. This problem is the solid-laden rag that hangs at the oil-water interface. Once this interface mud accumulates at the interface it becomes quiescent and the rate of water and solids separation is slowed significantly. When the rate of collapse for interface rag is slower than the rate of accumulation, the interface volume increases and interferes with the desalter operation. While the exact nature of this interface rag cannot be readily determined, the effects are detrimental to the performance of the desalter in one of two ways.

If the interface rag floats on top of the water, then it can grow in height until it interferes with the integrity of the electrostatic field by increasing the current demand and reducing the field strength. The electric field does apply added energy to the top of the interface and can accelerate the rate of decay. If the interface sinks into the water layer it rapidly occupies the water volume of the desalter and reduces the water residence time. The effect is a decline in the water quality that is passed to the water treatment facility as the interface rag settles to the bottom of the vessel to form mud and mixes with the brine exiting to the brine heat exchangers and benzene recovery unit. This mixing accelerates the fouling and plugging of the heat exchangers and benzene recovery unit.

Because refineries have more complex and overlapping issues, system applications need to be expanded beyond the simple purpose of removing sludge and solids from the bottom of desalter vessels. A need exists, therefore, for a system that assists a refinery in meeting planned crude unit run-length expectations, does not put the desalter in an upset condition during operation, minimizes or eliminates sludge buildup at the bottom of the vessel, improves basic sediment and water (BS&W) reduction performance, improves salt reduction performance, minimizes emulsion and reverse emulsion buildup at the oil/water interface, keeps solids suspended in the brine until the solids exit to the process sewer, and protects process equipment ahead of the waste water treatment plant.

BRIEF SUMMARY OF THE INVENTION

A method and system for controlling an interface rag layer within a desalter vessel includes injecting a water flow through a plurality of nozzles arranged about a piping circuit so that a volume of water in the brine water layer rotates, thereby uniformly suspending solids in the brine water and promoting a collapse of the interface rag layer from the brine water side of the rag layer. The piping circuit is preferably located in an upper portion of the water layer—preferably in the upper two-thirds of the water layer—and an external periphery of the piping circuit lies near to and opposite of an internal periphery of the desalter vessel.

Each nozzle in the plurality of nozzles lies in the same horizontal plane and is oriented toward an interior space of the desalter vessel at the same angular orientation as all other nozzles. Water velocity through the nozzles, which may be in a range of 1 to 3 fpm, promotes a slow and continuous agitation of the water. By introducing a small water volume at 1 to 3 fpm, rotation of the entire water volume below the interface rag layer results and, eventually, the entire water volume rolls over at 1 to 3 fpm. This velocity across the lower side of the interface rag layer promotes its collapse. The interface rag layer may be monitored and the water flow adjusted accordingly. Each nozzle may be a drilled passageway and is preferably oriented in the horizontal plane at an angle of about 15° to 60° relative to a pipe circuit center line and at a downward angle of about 15° to 60° from the horizontal plane. The rotation of the water, therefore, is coincident to the angular orientation of the nozzle in the horizontal plane, either clockwise or counterclockwise, and forms a toroidal rotation coincident to the downward angular orientation of the nozzles that gently sweeps both the bottom of the rag layer and the bottom of the vessel.

A better understanding of the method and system for controlling the interface rag layer will be obtained from the following detailed description of the preferred embodiments taken in conjunction with the drawings and the attached claims.

BRIEF DESCRIPTION OF THE DRAWINGS

FIG. 4A illustrates the flow pattern of FIG. 4 in greater detail. The flow pattern is a rotating plane toroidal flow that consumes each sector and looks like a series of large horizontal plane doughnuts.

DETAILED DESCRIPTION OF THE PREFERRED EMBODIMENTS

Figure 1:
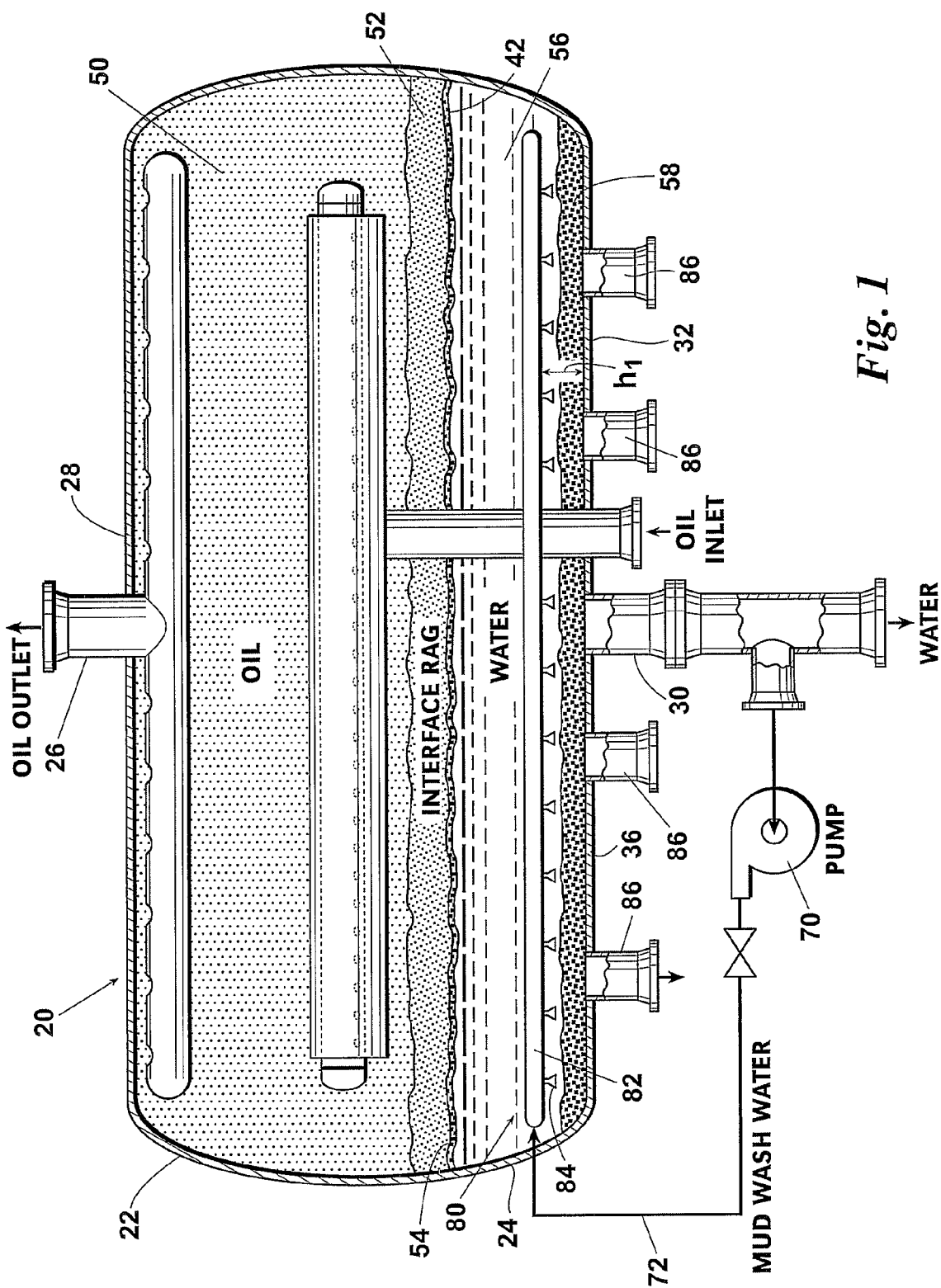
FIG. 1 is a view of a prior art desalter equipped with a mud washing system. The washing system consists of a set of spray nozzles that disperse a volume of fresh water into the desalter for the purpose of agitating the mud that has settled at the bottom of the vessel so that the mud can be effectively removed from the desalter through a series of mud drains located at the bottom of the desalter. This system does not address the solid-laden rag that collects and hangs at the lower surface of the oil-water interface layer.

The present invention provides a method and system for preventing mud build-up within a separator vessel by continuously agitating the lower surface of the interface rag layer so as to suspend solids in the water layer and promote the collapse of mud residing in the interface rag layer. Elements illustrated in the drawings are identified by the following numbers:

| | |
|---|---|
| 10 | Interface emulsion control system |
| 20 | Separator vessel |
| 22 | Upper portion of 20 |
| 24 | Lower portion of 20 |
| 26 | Oil outlet |
| 28 | Top of 20 |
| 30 | Water outlet |
| 32 | Bottom of 20 |
| 34 | Rag drain |
| 36 | Inner wall surface of 20 |
| 38 | Recycle pump |
| 40 | Recycle piping |
| 42 | Interface rag |
| 50 | Oil layer |
| 52 | Interface emulsion layer |
| 54 | Lower surface of 52 |
| 56 | Water layer |
| 58 | Oil-coated solids/mud |
| 60 | First piping circuit |
| 62 | Nozzle |
| 64 | Outer periphery of 60 |
| 66 | Inner periphery of 60 |
| 68 | Centerline of 60 |
| 70 | Recycle pump |
| 72 | Recycle piping |
| 80 | Mud wash system |
| 82 | Piping |
| 84 | Spray nozzle |
| 86 | Mud drain |
| 88 | Second piping circuit |
| 90 | Supports |
| 92 | Nozzle |

Referring first to FIG. 1, a separator vessel 20 is connected by conventional piping (not shown) to a crude oil source. Vessel 20 is of a type well-known in the art and commonly used in crude oil production and refining for dehydration and desalting of crude oil. A crude oil stream containing water and solid contaminants enters vessel 20 through the identified "oil inlet". Vessel 20 typically holds those components and processes them so that the oil is separated from the contaminants. The separated oil layer 50 is then removed from vessel 20 through an outlet 26 located at the top 28 of vessel 20.

Figure 2:
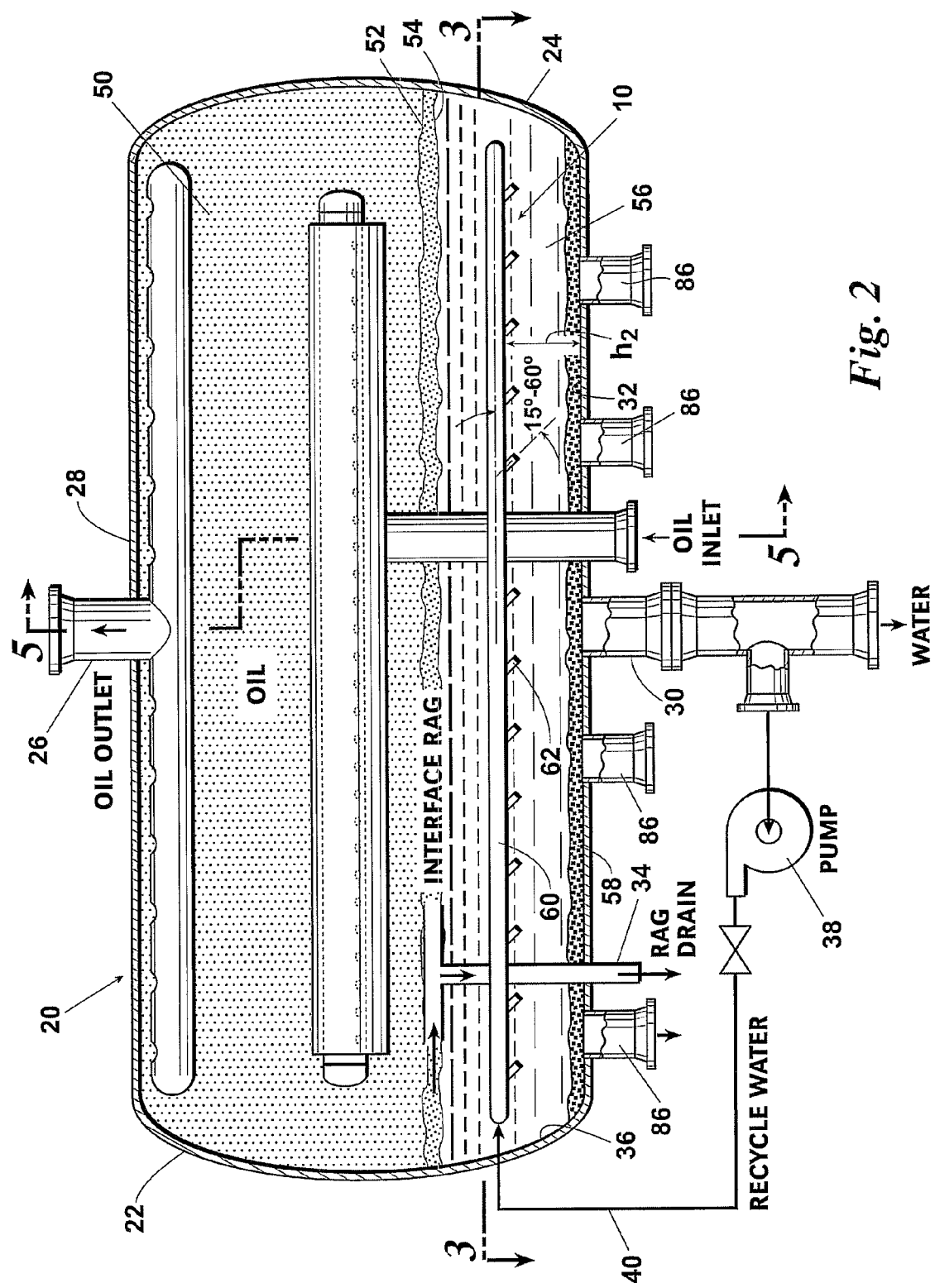
FIG. 2 is a view of another preferred embodiment of a desalter equipped with a wash system made according to this invention. The wash system includes a piping circuit that is equipped with a series of nozzles oriented at an angle in the horizontal plane and also at a downward angle in the vertical plane. Water from the water layer is recycled into the piping circuit and re-injected into the water layer at a low flow rate.

During the separation process, it is common for oil-coated solids, called mud 58, to accumulate on a bottom 32 of vessel 20 and for a layer comprising a mixture of oil and water, called interface emulsion layer 52, to form in an intermediate portion of vessel 20. A solid-laden or brine water layer 56 accumulates between the layer of mud 58 residing on the bottom 32 and the layer of interface rag or emulsion 52. To prevent the interface rag layer or emulsion 52 from accumulating until its presence begins to interfere with the performance of vessel 20, a rag drain 34 may be provided (See FIG. 2). The removal of the interface rag layer or emulsion 52 preferably occurs continuously and the removal rate may vary over time. Oil layer 50 accumulates above the interface emulsion layer 52 in the upper portion 22 of vessel 20.

Some "rag," referred to as interface rag 42, rather than settling to the bottom 32 of vessel 20, may float on top of the water layer 56 and "hang" at the lower surface 54 of the interface emulsion layer 52 as shown in FIG. 1. As this interface mud 42 accumulates it becomes quiescent and the rate of water and solids separation is slowed significantly. When the rate of collapse and settlement of interface rag 42 is slower than the rate of its accumulation, the volume of interface emulsion layer 52 increases and begins to interfere with the operation of vessel 20. For example, interface rag 42 may sink into the water layer 56 and occupy water volume, thereby reducing water residence time, decreasing the quality of water passed to a treatment facility. Additionally, interface emulsion layer 52 may grow in height until it interferes with the integrity of an electrostatic field (not shown in the drawings) being applied to promote separation of components in the crude oil. Furthermore, as the interface rag 42 collapses it settles to the bottom 32 of vessel 20 and contributes to oil coated solids/mud 58 that accumulates in the vessel bottom. This oil-coated solids/mud 58 must be removed periodically, usually by way of a prior-art mud wash system 80 (see FIG. 1).

A mud wash system 80, as known in the prior art, includes piping 82 arranged in sections along a lower portion 24 of vessel 20 at a distance "$h_1$" from the bottom 32 of vessel 20 (usually in the bottom third of water layer 56). Piping 82 may include two outer pipes (not shown) that run near and along the interior wall surface 36 of vessel 20 and one middle pipe (not shown) spaced equidistant from, and running parallel to, each outer pipe. A series of spray nozzles 84 are connected to the piping 82 and oriented downward at a 90° angle relative to a centerline line of piping 82. The spray nozzles 84 disperse a volume of water into the desalter for the purpose of agitating the mud 58 so it can be effectively removed from the desalter by way of mud drains 86. A recycle pump 70 and recycle piping 72 may be employed to recycle the mud wash water.

Prior-art mud wash system 80 does not prevent the build-up of mud 58. This system also does not prevent episodic build-up of the interface emulsion layer 52, nor does it reduce salt, reduce basic sediment and water (BS&W), eliminate interface rag 42, or eliminate reverse emulsion migration from interface emulsion layer 52 to water layer 56.

Referring to FIGS. 2-5, a system 10 is illustrated for slowly and continuously agitating the interface emulsion layer 52 to prevent or control the build-up of interface emulsion layer 58 and keep the fines that contribute to mud layer 42 suspended in the brine water layer 56. System 10 (to be described) imparts enough velocity and motion into the water layer 56 to suspend solids therein until they are removed with water layer 56 as it is removed from vessel 20 and also creates a washing action under interface rag 42 to aid in water-wetting solids and recovery of oil to oil layer 50. System 10, which is capable of servicing desalter operations across a full range of API gravity crude oils, preferably utilizes no filters.

Figure 3:
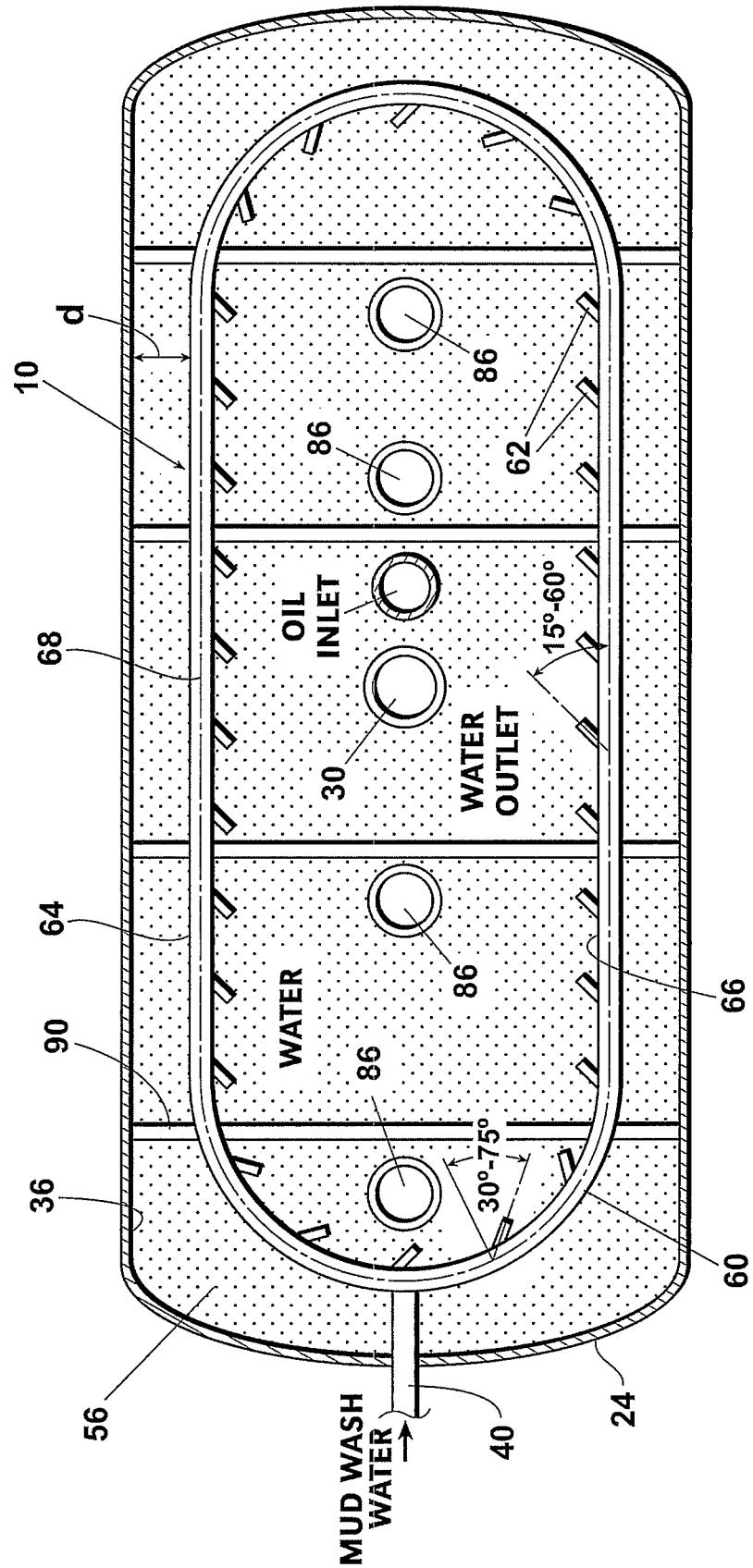
FIG. 3 is a top view of the wash system of FIG. 2 and illustrates the spacing relationship between the oblong-shaped piping circuit and the interior wall of the desalter. The piping circuit is preferably laid across horizontal supports as illustrated and clamped in place.

System 10 includes an oblong-shaped first piping circuit 60 that is located in a lower portion 24 of vessel 20. The outer peripheral surface 64 of first piping circuit 60 is at distance "d" from the inner wall surface 36 of vessel 20. The piping circuit 60 is also at a distance "$h_2$" from the bottom 32 of vessel 20. In a preferred embodiment, distance $h_2$ places first piping circuit 60 in the upper two-thirds of the height of water layer 56 in vessel 20. First piping circuit 60 may be supported by a set of horizontal supports 90 as seen in FIG. 3.

First piping circuit 60 produces a slow circulation of water layer 56 and, therefore, a slight water velocity across the lower surface 54 of the interface emulsion layer 52. This slight velocity, which is established by a series of angled nozzles 62, prevents build-up of interface rag 42 and reduces or eliminates mud 58. Furthermore, the continuous circulation helps keep fines suspended in water layer 56 so that the fines are discharged directly with the discharge of water layer 56, thus eliminating the need for frequent mud wash of vessel 20.

Nozzles 62 are arranged and spaced about the inner periphery 66 of first piping circuit 60 (see FIG. 3) and generally are pointed interiorly of vessel 20. Nozzles 62 may be drilled passageways in first piping circuit 60 or may be, as illustrated, short length tubular members. Each nozzle 62 is preferably oriented at an angle of between about 15° and 60° in a horizontal plane relative to a line perpendicular to centerline 68 of first piping circuit 60 and at a downward angle of between about 15° and 60° in the vertical plane. The 15° to 60° angle translates to a 30° to 75° angle between a line drawn through the longitudinal centerline of the nozzle 62 and a line drawn perpendicular to centerline 68. The preferred horizontal and vertical plane angle is 45°. Alternatively, each nozzle 62 may be oriented at between about 105° and 150° in the horizontal plane, thereby promoting a clockwise (opposite) flow.

Figure 4:
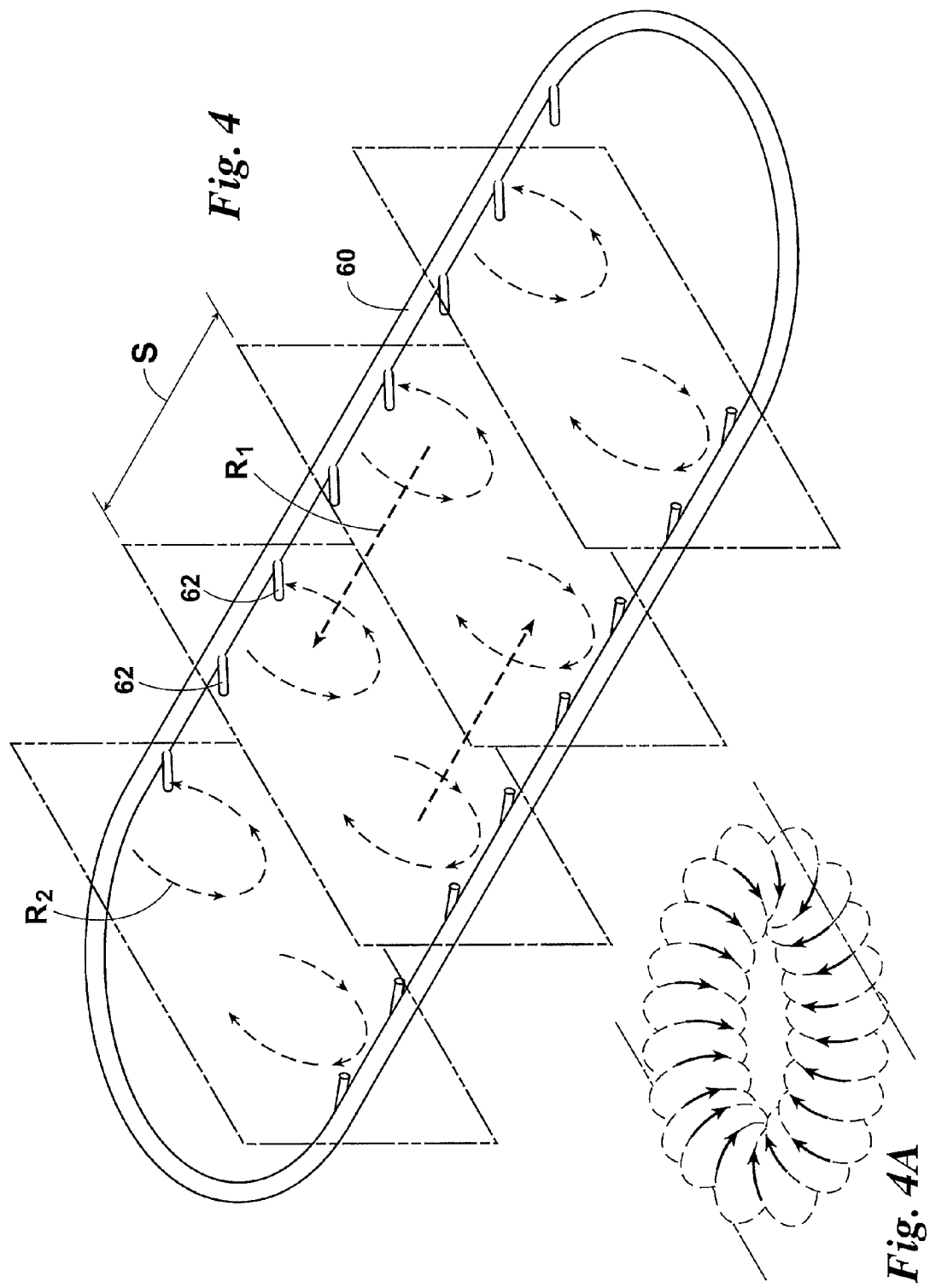
FIG. 4 illustrates the turbulence of the water layer caused by the nozzles of the piping circuit of FIG. 2. Once the flow from the nozzles is established, the bulk of the water layer will begin to rotate slowly in a toroidal-shaped rotation in the vertical plane and in the horizontal plane. These combined rotations prevent the build-up of mud by lifting the fines from the bottom of the desalter and continuously agitating the lower surface of the interface rag layer.
Figure 5:
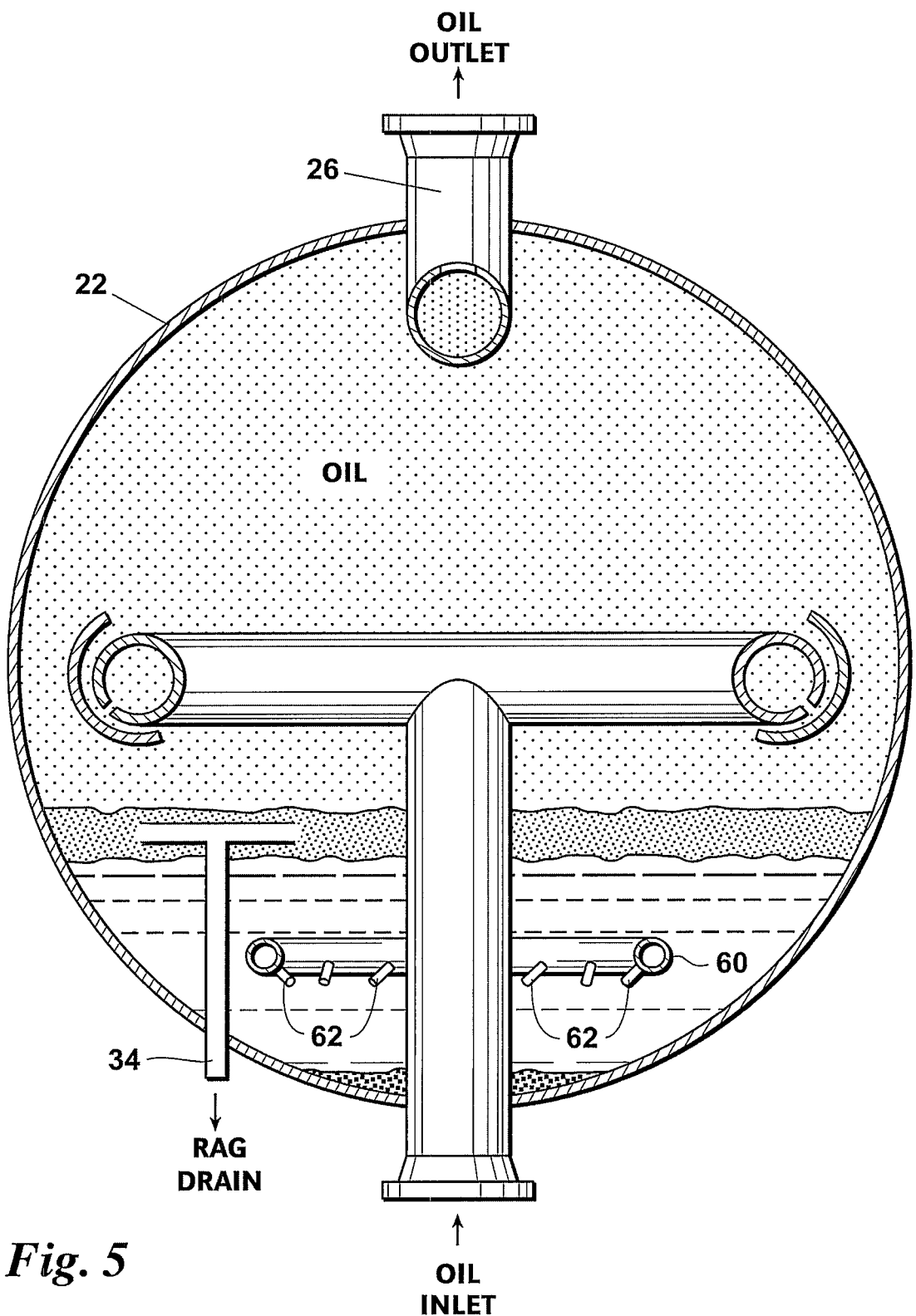
FIG. 5 is a vertical cross-sectional view taken along the line 5-5 of FIG. 2.

Referring to FIGS. 4 & 4A, the water flow through each nozzle 62 is preferably at a low velocity in the range of about 1 to 3 feet per minute (fpm). Once the flow from the nozzles 62 is established, the bulk of water layer 56 will begin to rotate slowly and in two directions, $R_1$ and $R_2$. Rotation $R_1$ is in a horizontal plane coincident to the clockwise or counterclockwise orientation of nozzles 62. Rotation $R_2$ is a toroidal-shaped rotation in a vertical plane. Rotations $R_1$ and $R_2$ continuously agitate the lower surface 54 of the interface emulsion layer 52 and keep the solids suspended in water layer 56 by lifting the fines from the bottom 32 of vessel 20. The flow pattern created by $R_1$ and $R_2$ is substantially a rotating plane toroidal flow that consumes each sector S and looks like a series of large horizontal plane doughnut-shaped flows (see FIG. 4A).

Controls (not shown) may be provided to control the water flow through nozzles 62, with first piping circuit 60 being controlled independent of second piping circuit 88. The flow may be adjusted, for example, to bring the level or volume of the interface emulsion layer 52 within a predetermined range.

Water removed from vessel 20 through water outlet 30 may be routed to a recycling pump 38 for recycling the water back into the water layer 56. Recycling pump 38 is preferably an ANSI/API centrifugal pump including duplex seals with barrier fluid and an expeller on the back of the impeller to protect seal integrity. No filtration is required in the recycle piping 40.

In a preferred embodiment, after the initial lineout of desalter operation, the water flow rate through nozzles 62 is increased until interface rag layer 52 begins to upset. The water flow rate is then reduced until interface emulsion layer 52 begins to stabilize. Interface rag layer 52 is then monitored at the first tryline under the interface emulsion layer 52 and appropriate adjustments made to the water flow rate.

Figure 1A:
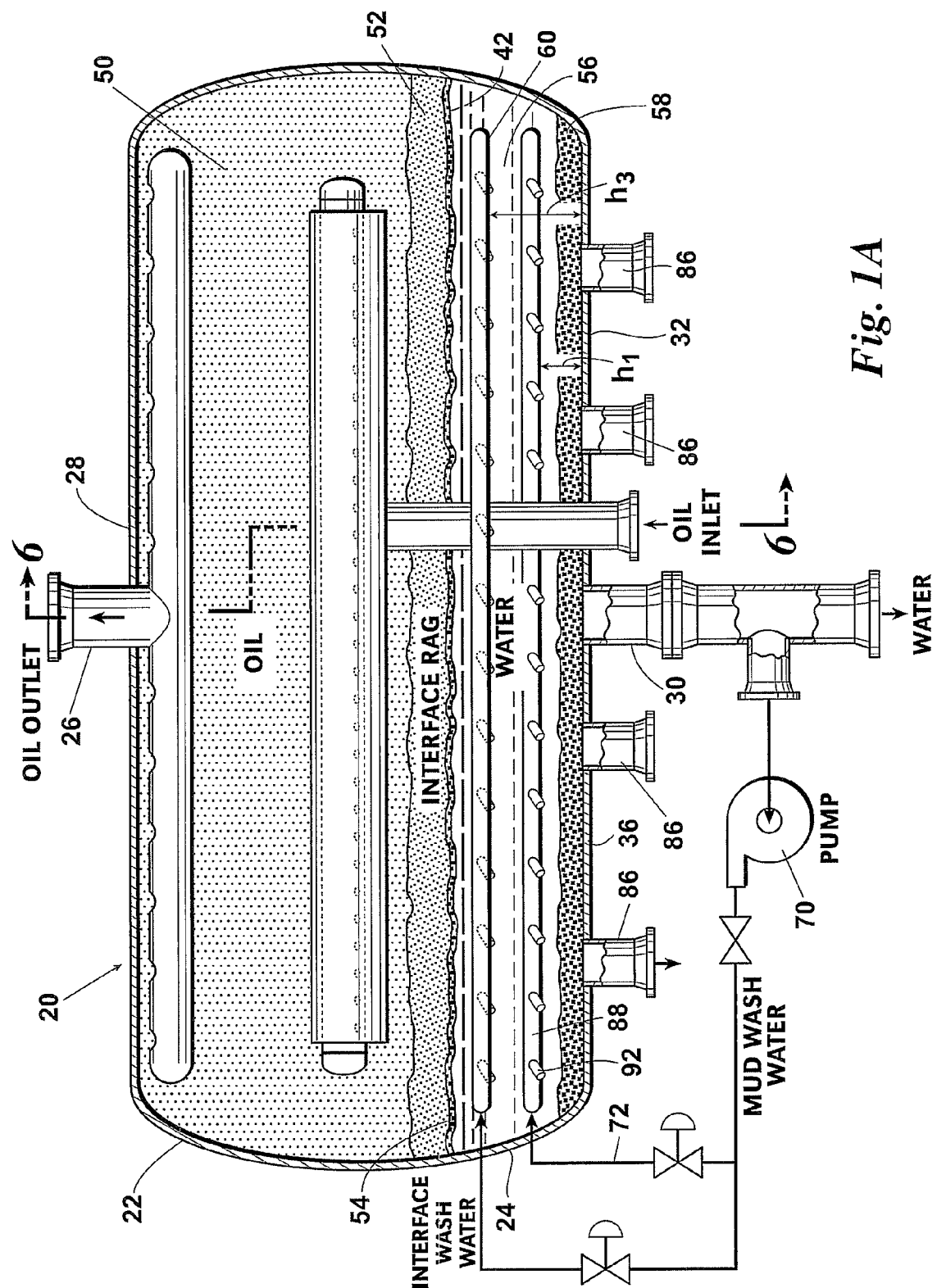
FIG. 1A is a view of a preferred embodiment of a desalter equipped with a wash system made according to this invention. Two piping circuits are equipped with a series of nozzles and independently controlled. The first piping circuit, which is placed below the interface rag layer, includes a set of nozzles oriented to gently scrub the bottom of the interface rag and promote separation. The second piping circuit, which is placed above the mud layer, includes a set of nozzles oriented oblique to the mud layer to gently fluidize the mud from the bottom of the vessel.
Figure 6:
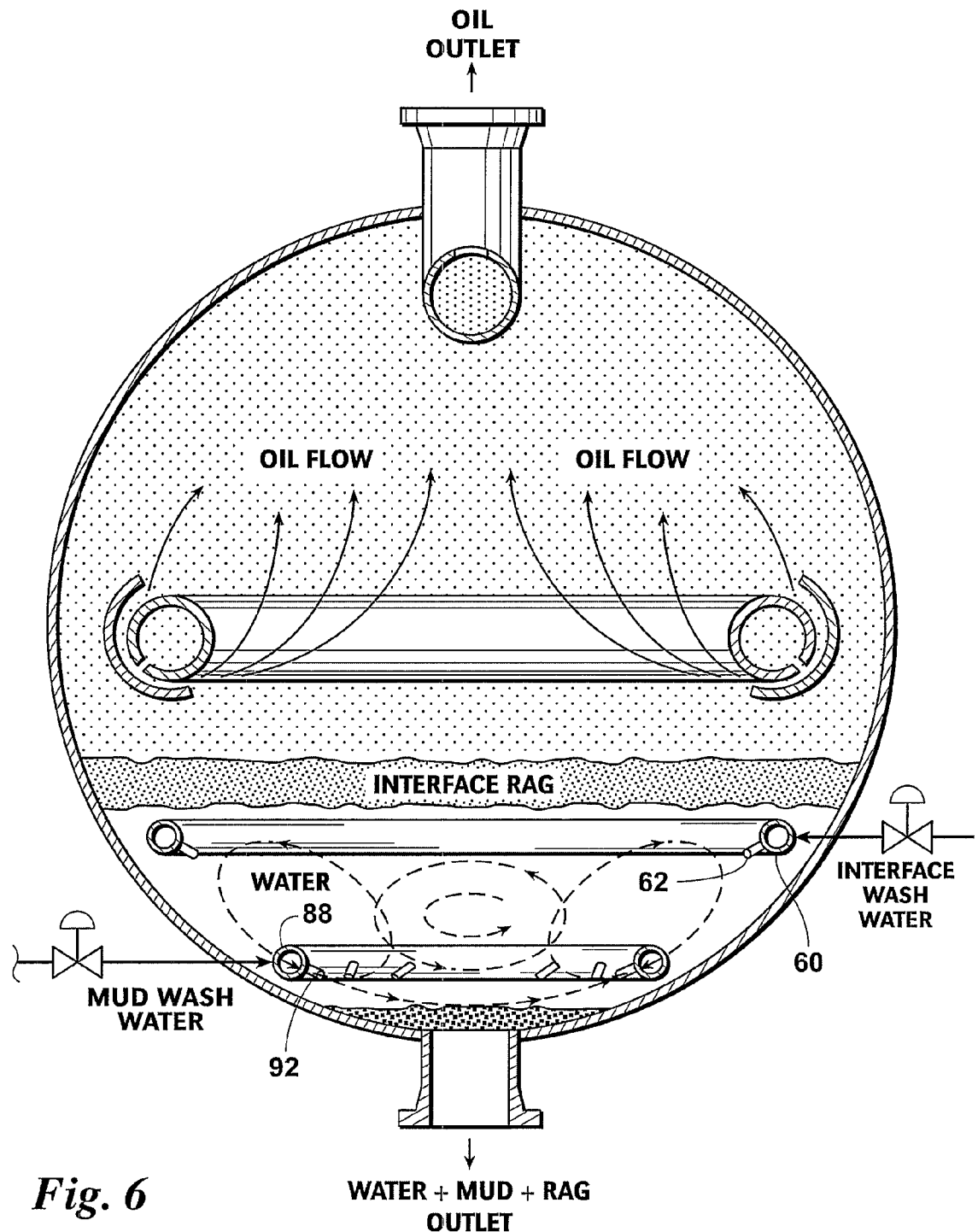
FIG. 6 is a vertical cross-sectional view taken along section line 6-6 of FIG. 1A.

Referring now to FIGS. 1A & 6, an alternate embodiment of system 10 includes an oblong-shaped first piping circuit 60 and an oblong-shaped second piping circuit 88, each equipped with nozzles 62, 92 and independently controlled. The water flow through each nozzle 62, 92 is preferably at a low velocity in the range of about 1 to 3 feet per minute (fpm). First piping circuit 60 is placed below the interface emulsion layer 52 at a distance "$h_3$" from the bottom 32 of vessel 20 in order to gently scrub the bottom of the interface emulsion layer 52. Nozzles 62 are preferably oriented at an angle of between about 15° and 60° in a horizontal plane and in a vertical plane relative to centerline 68 of first piping circuit 60 (see FIGS. 2 & 3).

Second piping circuit 88 is placed at a distance "$h_1$" from the bottom 32 of vessel 20 in order to gently fluidize the mud 58 from the bottom 32 of the vessel 20. Unlike the arrangement of the prior art mud wash system 80 and its nozzles 84 (see FIG. 1), second piping circuit 88 is an oblong-shaped circuit similar to that of first piping circuit 60, with its nozzles 92 oriented oblique to the mud layer 58. Nozzles 92 are preferably oriented at an angle of between about 15° and 60° in the horizontal plane relative to the centerline of second piping circuit 88 and at a downward angle of between 15° and 60° in the vertical plane. Preferably, there is no interference between the upper and lower toroids.

A system 10 made according to this invention affects a number of performance issues typically associated with a separator vessel 20. System 10 eliminates or minimizes episodic build-up of the interface emulsion layer 52, reduces salt, reduces basic sediment and water (BS&W), eliminates rag layer separation, and eliminates reverse emulsion migration from the interface rag to the brine water layer.

While preferred embodiments of an interface and mud control system have been described with a certain degree of particularity, many changes may be made in the details of construction and the arrangement of components without departing from the spirit and scope of this disclosure. The control method and system therefore is not limited to the embodiments set forth herein for purposes of exemplification, but are to be limited only by the scope of the attached claims, including the full range of equivalency to which each element or step thereof is entitled.

What is claimed is:

1. A method for controlling a height of an interface emulsion layer within an oil treatment vessel, the method comprising the step of:
   inducing a first and a second rotation entirely within a brine water layer of the oil treatment vessel, the first rotation being in a horizontal plane, the second rotation being in a vertical plane, the first and second rotations together forming a first series of rotating plane toroidal flows throughout the brine water layer, the rotating plane toroidal flows being at a velocity that permits the interface emulsion layer to continue residing above the brine water layer.

2. A method according to claim 1 further comprising the step of forming a second series of rotating plane toroidal flows throughout the brine water layer, one of said first and second series being an upper toroidal flow and one being a lower toroidal flow.

3. A method according to claim 1 wherein the oil treatment vessel includes a plurality of nozzles arranged about an oblong-shaped piping circuit located in the brine water layer of the oil treatment vessel.

4. A method according to claim 1:
   wherein the plurality of nozzles are oriented oblique to the piping circuit.

5. A method according to claim 4 wherein an angular orientation of each nozzle in the plurality of nozzles is at an angle of between about 15° and 60° in a horizontal plane and at a downward angle of between about 15° and 60° in a vertical plane.

6. A method according to claim 1 further comprising the step of recycling a volume of water from the oil treatment vessel, wherein the first and second rotations include the recycled water.

7. A method according to claim 1 further comprising the step of monitoring a level of the interface emulsion layer.

8. A method according to claim 1 further comprising the step of adjusting a velocity of the first and second rotations in response to a level of the interface emulsion layer.

9. A method according to claim 8 wherein said step of adjusting causes the interface emulsion layer to destabilize.

10. A method according to claim 8 wherein said step of adjusting causes the interface emulsion layer to stabilize.

11. A method according to claim 1 wherein a water velocity through each nozzle in the plurality of nozzles is in a range of 1 to 3 fpm.

\* \* \* \* \*